(12) United States Patent
Rivera Gutierrez et al.

(10) Patent No.: US 12,146,803 B2
(45) Date of Patent: Nov. 19, 2024

(54) LOAD CELL WITH A FORCE TRANSMITTING ELEMENT HELD BY A GEL ELEMENT

(71) Applicant: TE Connectivity Solutions GmbH, Schaffhausen (CH)

(72) Inventors: Jose Luis Rivera Gutierrez, Bevaix (CH); Ismael Brunner, Bevaix (CH); Thomas Arnold, Bevaix (CH)

(73) Assignee: TE Connectivity Solutions GmbH, Schaffhausen (CH)

( * ) Notice: Subject to any disclaimer, the term of this patent is extended or adjusted under 35 U.S.C. 154(b) by 281 days.

(21) Appl. No.: 17/714,294

(22) Filed: Apr. 6, 2022

(65) Prior Publication Data
US 2022/0326100 A1    Oct. 13, 2022

(30) Foreign Application Priority Data
Apr. 7, 2021 (EP) .................................... 21167236

(51) Int. Cl.
*G01L 1/22* (2006.01)

(52) U.S. Cl.
CPC ............ *G01L 1/2287* (2013.01); *G01L 1/225* (2013.01)

(58) Field of Classification Search
CPC .............................. G01L 1/2287; G01L 1/225
See application file for complete search history.

(56) References Cited

U.S. PATENT DOCUMENTS

| | | | |
|---|---|---|---|
| 4,506,556 A | 3/1985 | Siby | |
| 4,644,805 A | 2/1987 | Hafner | |
| 4,754,653 A * | 7/1988 | Hafner | B29C 39/08 73/862.68 |
| 6,478,565 B2 | 11/2002 | Woodmansee et al. | |
| 7,294,793 B2 | 11/2007 | Axakov et al. | |
| 7,726,197 B2 * | 6/2010 | Selvan | G01L 1/18 73/777 |
| 8,757,001 B2 * | 6/2014 | Wade | G01L 1/2231 73/777 |
| 8,806,964 B2 * | 8/2014 | Thanigachalam | G01L 9/0054 73/862.627 |

(Continued)

FOREIGN PATENT DOCUMENTS

| | | |
|---|---|---|
| DE | 3344901 A1 | 6/1985 |
| EP | 0440011 A2 | 8/1991 |

(Continued)

OTHER PUBLICATIONS

Japanese Office Action dated Aug. 22, 2023 with English translation, corresponding to Application No. 2022-047741, 9 pages.

(Continued)

*Primary Examiner* — Kyung S Lee
(74) *Attorney, Agent, or Firm* — Barley Snyder

(57) ABSTRACT

A load cell includes a force transmitting element, a force sensing element converting a force acting on the force transmitting element into a measurement signal, a cover having an opening spaced apart from the force sensing element, and a gel element disposed in the opening. The force transmitting element extends into the opening and from the opening toward the force sensing element. The force transmitting element rests against the gel element in the opening.

20 Claims, 1 Drawing Sheet

(56) References Cited

U.S. PATENT DOCUMENTS

| | | | |
|---|---|---|---|
| 10,113,927 B2* | 10/2018 | Wade | G01L 9/0048 |
| 2007/0006668 A1* | 1/2007 | Hirabayashi | G01L 1/26 |
| | | | 73/862.541 |
| 2016/0273955 A1 | 9/2016 | Kroll et al. | |

FOREIGN PATENT DOCUMENTS

| | | |
|---|---|---|
| EP | 1739401 A1 | 1/2007 |
| JP | S53072591 A | 12/1979 |
| JP | S59017124 A | 1/1984 |
| JP | S59171824 A | 9/1984 |
| JP | S60200137 A | 10/1985 |
| JP | 2000205976 A | 7/2000 |
| JP | 2000210735 A | 8/2000 |
| JP | 2004264059 A | 9/2004 |
| JP | 2005517951 A | 6/2005 |
| JP | H105099769 A | 12/2012 |
| WO | 8603584 | 6/1986 |
| WO | 03071246 A1 | 8/2003 |
| WO | 2004072597 A1 | 8/2004 |

OTHER PUBLICATIONS

Office Action from the Japanese Patent Office dated Feb. 21, 2023 (with English Translation thereof), corresponding to Application No. 2022-047741, 16 pages.

Extended European Search Report, Application No. 21167236.5-10001, Dated: Sep. 28, 2021, 7 pages.

Japanese Office Action dated May 9, 2023 with English translation thereof, corresponding to Application No. 2022-047741, 12 pages.

\* cited by examiner derlying the patent application in the field of load cells.

LOAD CELL WITH A FORCE TRANSMITTING ELEMENT HELD BY A GEL ELEMENT

CROSS-REFERENCE TO RELATED APPLICATIONS

This application claims the benefit of the filing date under 35 U.S.C. § 119(a)-(d) of European Patent Application No. 21167236.5, filed on Apr. 7, 2021.

FIELD OF THE INVENTION

The present invention relates to a load cell.

BACKGROUND

A wide variety of different designs are available for load cells that are capable of measuring a force and/or load accurately under some conditions. Still, there is a need for a load cell which performs exact measurements in an unclean environment that is subject to strong vibrations.

SUMMARY

A load cell includes a force transmitting element, a force sensing element converting a force acting on the force transmitting element into a measurement signal, a cover having an opening spaced apart from the force sensing element, and a gel element disposed in the opening. The force transmitting element extends into the opening and from the opening toward the force sensing element. The force transmitting element rests against the gel element in the opening.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
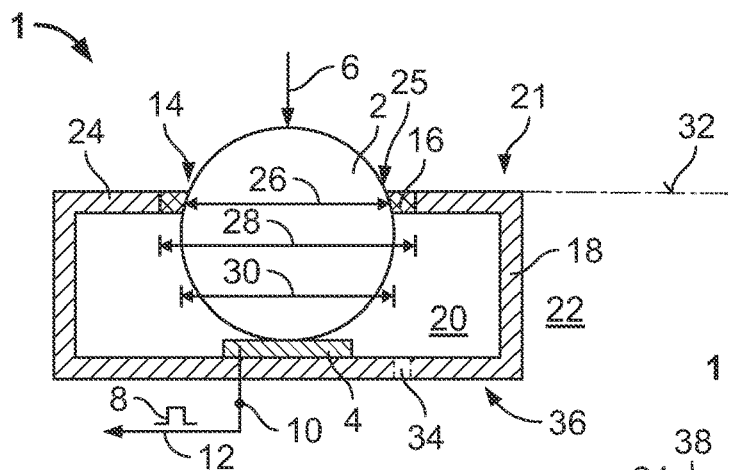
FIG. 1 is a schematic sectional view of a load cell according to an embodiment.

In the following, the invention is described exemplarily with reference to the drawings and various embodiments. Any feature of an embodiment may be omitted if the technical effect of the feature is not necessary in a specific application. Mutatis mutandis, any feature described herein but not described as part of an embodiment may be added if the technical effect associated with this feature is beneficial to a particular application. In the following, elements that correspond to one another with respect to at least one of structure and function are provided with identical reference numerals.

First, the general structure of a load cell 1 is explained with reference to FIG. 1. The load cell 1 comprises a force transmitting element 2, which is only depicted as a sphere for explanatory reasons. This configuration allows for a small, almost point-like, contact surface between the force transmitting element 2 and any device via which a force acts on the force transmitting element 2. The force transmitting element 2 may have any shape, in particular a shape which is different from a sphere. For example, the force transmitting element 2 may be a cylinder. Such a design may be useful to decrease the load per unit area that the force acting on the force transmitting element 6 exerts.

The force transmitting element 2 may be made from a metal material, a ceramics material and/or a resin material, such as a fibre-reinforced resin material. This ensures low wear and a purely elastic deformation of the force transmitting element 2 over a wide range of forces.

The load cell 1, as shown in FIG. 1, further comprises a force sensing element 4, which is configured to convert a force 6 which acts on the force transmitting element 2 into a measurement signal 8, which is representative of the force 6. The force transmitting element 2 is configured to transmit the force 6 to the force sensing element 4. In an embodiment, the force transmitting element 2 is arranged to be accessible from outside the load cell 1 so that the force 6 may act upon it. It may extend into the load cell 1 to transmit the force 6 to the force sensing element 4 which may be located inside the load cell 1.

The measurement signal 8 may be a digital signal or an analog signal and may be presented for output at a signal terminal 10 of the load cell 1 or output on a signal line 12. The signal line 10 may be wire-based or be configured to transmit the measurement signal 8 wirelessly.

As shown in FIG. 1, the load cell 1 further comprises an opening 14, into which the force transmitting element 2 extends. The opening 14 is spaced apart from and located opposite the force sensing element 4. The force transmitting element 2 extends from the opening 14 towards the force sensing element 4.

The load cell 1 further comprises a gel element 16 shown in FIG. 1, which may be made from a gel or a material with gel-like properties, in particular, gel-like deformation and dampening properties, such as rubber, elastomers and/or rubber-elastic materials.

In the opening 14, the force transmitting element 2 rests against the gel element 16. In particular, the gel element 16 may line the opening 14 and surround the force transmitting element 2, continuously in an embodiment. A continuous lining provides a dampening effect in all directions.

The gel element 16 may be electrically conductive or an electrical insulator; electrical conductivity allows the force transmitting element 2 to have the same electrical potential as other elements of the load cell 1. In an embodiment, the force transmitting element 2 may be grounded using an electrically conductive gel element 16. In other applications, the gel element 16 may be an electric insulator, which insulates electrically the force transmitting element 2 from those components 1 that form the opening 14.

The gel element 16 may adhere to the force transmitting element 2, e.g. by bonding, such as physical and/or chemical bonding, or by gluing. In FIG. 1, the gel element 16 is annular.

The force sensing element 4 may comprise a Micro Electrical-Mechanical System (MEMS) force transducer, which may include a membrane for measuring the force 6. The force sensing element 4, in an embodiment, is arranged exactly opposite the opening 14.

The load cell 1 may comprise a cover 18 which may be part of a packaging 21, as shown in FIG. 1. The packaging 21 may include the force sensing element 4 and any electrical connections, such as the signal terminal 10. The opening 14 may be formed in the packaging 21.

The load cell 1 may include an interior space 20, which is at least partly surrounded by the cover 18. The force transmitting element 2 extends through the opening 14 into the interior space 20. The interior space 20 separates the opening 14 from the force sensing element 4. The opening 14 may connect the interior space 20 to an exterior 22 of the load cell 1. In the load cell of FIG. 1, the opening 14 is sealed by the force transmitting element 2 and the gel element 16, which are sealingly engaged. Thus, dirt and fluids are prevented from reaching the force sensing element 4, and applicability of the load cell 1 in dirty environments is improved.

In another embodiment, the gel element 16 may seal the opening 14 completely by itself vis-à-vis the force sensing element 4. This provides a continuous seal without any gaps, which may otherwise allow fluids to reach the force sensing element 4 via capillary forces.

The load cell 1 may comprise a cover structure 24, shown in FIG. 1, which may be configured to support or prop the gel element 16, particularly in and/or in the region of the opening 14. The cover structure 24 may be part of the cover 18 and/or the packaging 21; in one embodiment, the cover structure 24 may be a part of an essentially pot-like or bell-like cover 18. In particular, the cover structure 24 may be a monolithic part of the cover 18. The cover structure 24 may be located spaced apart and oriented parallel to the force sensing element 4, in particular a membrane thereof. The cover structure 24 may be essentially rigid and lends rigidity to the gel element 16.

An opening may be provided both in the cover structure 24, or the cover 18 respectively, and in the gel element 16. In the following, the opening in the cover structure 24 and/or the packaging 21 is denoted by the reference numeral 14, the opening in the gel element 16 by reference numeral 25. The opening 25 in the gel element 16 may have a diameter 26, as shown in FIG. 1, which is smaller than a diameter 28 of the opening 14 in the cover structure 24. In an embodiment, the openings 14, 25 in the gel element 16 and the cover structure 24 are coaxial.

The diameter 28 may be larger than a diameter 30 of the force transmitting element 2, shown in FIG. 1, in particular the maximum diameter 30 of the force transmitting element 2 in a plane parallel to a plane 32 of the opening 14. The diameter 26 may be smaller than the diameter 30.

The load cell 1 may have a vent hole 34 which connects the interior space 20 with the exterior 22. The vent hole 34 may be on a side 36, the rear side of the load cell 1. Its location may vary in other embodiments; for example, it may be located underneath the force transmitting element 2 or spaced apart from it. The vent hole 34 may be configured to equalize an air pressure in the interior space 20 to an air pressure in the exterior 22 of the load cell 1.

The force transmitting element 2 is held moveably by the gel element 16. This movability may include several degrees of freedom and result from the elastic deformability of the gel element 16. The range of motion of the force transmitting element 2 is, however, limited to prevent plastic deformation of the gel element 16 in an embodiment. For example, the gap between the cover structure 24 and the force transmitting element 2, which gap is filled by the gel element 16, may be sized to allow only a reversible deformation of the gel element 16.

In operation, the force 6 acting on the force transmitting element 2 is transmitted through the force transmitting element 2 to the force sensing element 4 and converted to the measurement signal 8. Vibrational movements and rebounds under sudden forces 6 of the force transmitting element 2 are dampened or even suppressed by the gel element 16. The force transmitting element 2 is held floatingly or in a semi-located manner in place and centered by the gel element 16. The gel element 16 is thus a structural component of the load cell 1 which ensures its structural integrity and absorbs internal forces that occur in operation, and the connection has a low stiffness and reduces noise.

The vibrational damping effect of the gel element 16 may be increased if, according to another embodiment, the gel element 16 is arranged between the force transmitting element 2 and the force sensing element 4. In this embodiment, the gel element 16 forms a cushion between the force transmitting element 2 and the force sensing element 4.

The gel element 16 may at least partly, and in an embodiment completely, clad the force transmitting element 2 in an area of the force transmitting element 2, which area is located between the opening 14 and the force sensing element 4. This improves both the encapsulation of the force transmitting element 2 from the exterior of the load cell 1 and improves the vibrational damping of the force transmitting element 2.

The gel element 16 may be a separate, already solidified unitary piece that is fixed in place by being fastened to the cover structure 24, e.g. by gluing and/or a form fit. The gel element 16 may be bonded, such as chemically and/or physically bonded, to one or more components of the load cell 1. Alternatively, the gel element 16 may be an overmolded component that is applied in liquid form and solidified in place after the force transmitting element 2 has been mounted. In one embodiment, the gel element 16 may be formed as a membrane. The membrane may be a separate unitary, detachable body or may be formed by a layer, which is adhesive or bonded to other components of the load cell 1 e.g. by being molded in situ.

In FIG. 1 as well as in the other figures, the dimensions are not drawn to scale. Thus, the gel element 16 may have a larger or smaller material thickness as determined by the specific application. Moreover, the thickness of the gel element 16 may not be constant but vary, in particular as a consequence of molding it in place.

FIGS. 2 to 5 show other load cells 1 according to other embodiments. In the following, only those features are explained that differ from the load cell 1 of FIG. 1. If not explicitly mentioned otherwise, the structure and function of the load cells 1 of FIGS. 2 to 5 thus correspond to that of FIG. 1 and, more generally, to the structures and functions mentioned in the general part of the description.

Figure 2:
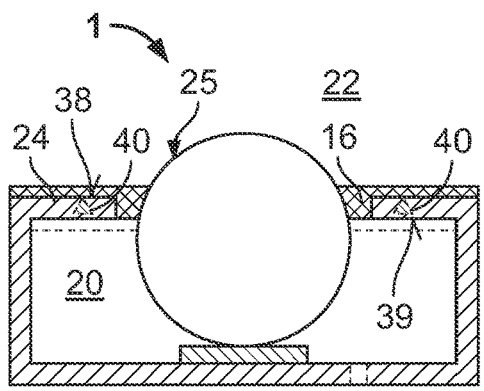
FIG. 2 is a schematic sectional view of a load cell according to another embodiment.

The load cell 1 of FIG. 2 comprises a gel element 16 which at least partly covers the cover structure 24. In particular, the gel element 16 may be arranged on a face 38, the front face, of the cover element 24, facing the exterior 22 and/or away from the interior space 20. In this embodiment, the gel element 16 is part of the outer surface of the load cell 1. Alternatively or cumulatively, the gel element 16 may be arranged on a rear face 39 of the cover structure 24, i.e. the face 39 that faces the interior space 20. This arrangement of the gel element 16 is indicated by the dotted lines.

In the embodiment of FIG. 2, the gel element 16 may be bonded to the front face 38, for example chemically and/or physically. A glue may be used to mount the gel element 16 on the cover structure 24. Alternatively or cumulatively, the gel element 16 may be fastened to the cover structure 24 using a form fit, e.g. by using interlocking form fit elements 40, such as one or more undercut protrusions and matching receptacles on the gel element 16 and the cover structure 24.

Again, the gel element 16 may be an originally separate element which has been fixed in place in an already solidified state, or it may be molded and solidified in place.

In FIG. 2, the connection between the gel element 16 and the cover structure 24 is strengthened as compared to the load cell 1 of FIG. 1. In addition, the sealing of the interior space 20 is improved.

Figure 3:
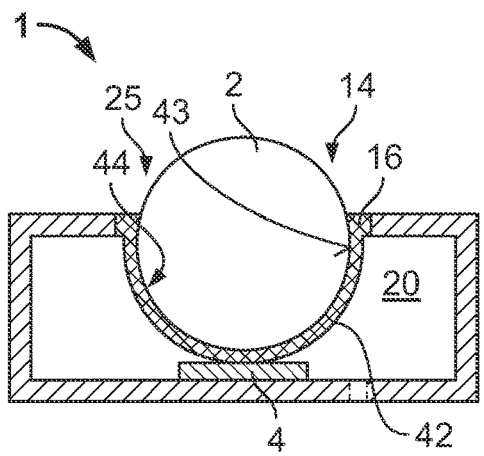
FIG. 3 is a schematic sectional view of a load cell according to another embodiment.

The load cell 1 of FIG. 3 differs from the load cell 1 of FIG. 1 in that the gel element 16 is also arranged between the force transmitting element 2 and the force sensing element 4. More specifically, the gel element 16 extends from the opening 14 into the interior space 20 and further between the force transmitting element 2 and the force sensing element 4. The gel element 16 covers an area 43 of the force transmitting element 2, which area 43 is located in the interior space 20 or, equivalently, extends from the opening 14 in the cover structure 24 and/or the packaging 21 towards the force sensing element 4.

The gel element 16 may form a discontinuous or continuous layer 42 on the force transmitting element 2 in the embodiment of FIG. 3. In an embodiment, the gel element 16 forms a continuous layer 42 on the force transmitting element 2. The gel element 16 may adhere to the force transmitting element 2.

In an embodiment, the entire surface of the force transmitting element 2 that is located in the interior space 20, i.e. in area 43, is covered by the gel element 16, as shown in FIG. 3. The gel element 16 thus forms a seal which completely seals the opening 14 in the cover structure 24 and/or packaging 21, closing off the interior space 20 from the exterior 22. The gel element 16 in this case may be formed as a membrane.

As shown in FIG. 3, the gel element 16 may comprise a bulge 44 in which the force transmitting element 2 is received at least partly. The bulge 44 lends further support and dampening to the force transmitting element 2. The bulge 44 is open at the opening 25 through which the force transmitting element 2 may be received. The bulge 44 may surround and thus define a volume which is, in an embodiment, completely separated from an interior space of the load cell 1, in which the bulge 44 is located.

Figure 4:
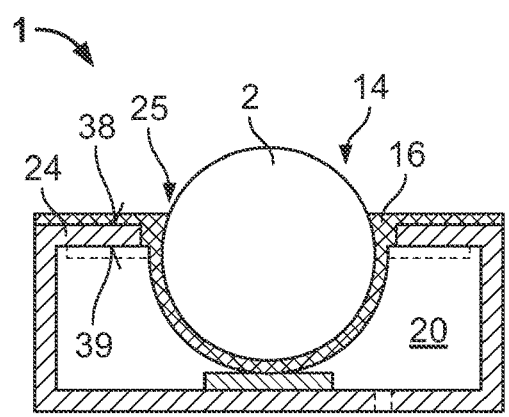
FIG. 4 is a schematic sectional view of a load cell according to another embodiment.

The load cell 1 of FIG. 4 shows exemplarily a combination of the features shown in the load cells 1 of FIGS. 2 and 3. The gel element 16 forms a membrane which covers the front face 38 of the cover structure 24. The gel element 16 further lines the opening 14 in the cover structure 24 and/or packaging 21, as with all the load cells of FIGS. 1 to 3. The gel element 16 further extends into the interior space 20 of the load cell 1, where it covers the force transmitting element 2 completely.

Figure 5:
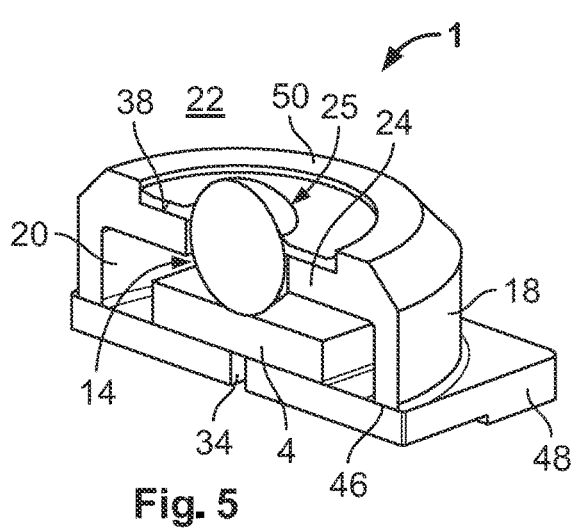
FIG. 5 is a schematic sectional perspective view of a load cell according to another embodiment.

The load cell 1 of FIG. 5 differs from the load cells 1 of FIGS. 1 to 4 in the design of the cover 18. The cover 18 is a bell-shaped or pot-shaped unitary structure. The cover structure 24 is a plate-like part of the cover 18, in which the opening 14 is formed. The cover 18 is at its end 46 sealingly connected to a substrate 48 on which the force sensing element 4 is fixed.

The substrate 48 and the cover 18 together enclose the interior space 20. The substrate 48 may be a part of the packaging 21 and may support, directly or indirectly, the force sensing element 4.

The gel element 16 in FIG. 5 is shaped as in FIG. 4 and thus seals the opening 14 against the exterior 22 of the load cell 1. The front face 38 of the load cell 1 is provided with an annular rim which protrudes from the cover 18 in a direction pointing away from the substrate 48 and/or away from the interior space 20. The protrusion 50 extends continuously around the opening 14, being spaced apart from the opening 14.

The protrusion 50 may serve as a centering aid if the gel element 16 is a separate unit which is mounted to the remainder of the load cell 1 in a solidified state. If the gel element 16 is molded in place onto the remainder of the load cell 1, the protrusion 50 may serve as a border to contain the liquid gel before solidifying.

The load cell 1 as described above may not only be used for force or pressure measurements, but may also be used for other measurement purposes, depending on the configuration of the force sensing element 4. For example, the force sensing element 4 may be configured to issue a measurement signal 8 which is representative of another physical quantity than force, such as for example displacement or temperature.

Although a cover structure 24 is shown in the embodiments of FIGS. 1 to 5, it may omitted if the stability of the gel element 16 is sufficient for the application at hand. In this case, the front face 38 may be solely formed by the gel element 16.

The present invention also relates to a method of manufacturing the load cell 1. In order to create the gel element 16, a gel material as defined above may be poured onto the opening 14 and/or the cover structure 24 with the force transmitting element 2 being located in the opening 14. The gel may be allowed to enter the opening 14, in particular the gap between the force transmitting element 2 and the opening 14, and then be covered or solidified. Alternatively, a unitary gel element 16, which is already solidified, may be installed in the opening 14 as a support for the force transmitting element 2. In this case, the gel element 16 may be fastened to the remainder of the load cell 1, e.g. the cover structure 24, by at least one of a form fit, bonding, such as chemical or physical bonding, and gluing.

What is claimed is:

1. A load cell, comprising:
   a force transmitting element;
   a force sensing element converting a force acting on the force transmitting element into a measurement signal;
   a cover defining an interior space in which the force sensing element is disposed, the cover has a cover structure with an opening arranged opposite and spaced apart from the force sensing element, the force transmitting element extends through the opening into the interior space toward the force sensing element; and
   a gel element disposed in the opening, the force transmitting element rests against the gel element in the opening.

2. The load cell of claim 1, wherein the gel element lines the opening.

3. The load cell of claim 1, wherein the gel element seals the opening.

4. The load cell of claim 1, wherein the gel element is arranged between the force transmitting element and the force sensing element.

5. The load cell of claim 1, wherein the gel element at least partly clads the force transmitting element in an area of the force transmitting element.

6. The load cell of claim 5, wherein the area of the force transmitting element is arranged between the opening and the force sensing element.

7. The load cell of claim 1, wherein the gel element is at least partly formed as a membrane.

8. The load cell of claim 1, wherein the gel element has a bulge in which the force transmitting element is at least partly received.

9. The load cell of claim 1, wherein the cover structure is rigid and props or supports the gel element.

10. The load cell of claim 9, wherein the opening extends through the cover structure.

11. The load cell of claim 9, wherein the gel element at least partly covers the cover structure on a front face of the cover structure, the front face faces away from the force sensing element.

12. The load cell of claim 9, wherein the gel element adheres to the cover structure.

13. The load cell of claim 10, wherein the opening in the cover structure has a diameter larger than at least one of a diameter of an opening in the gel element and a diameter of the force transmitting element.

14. The load cell of claim 1, wherein the gel element adheres to at least one of the force transmitting element and the force sensing element.

15. The load cell of claim 1, wherein the interior space extends between the opening and the force sensing element.

16. The load cell of claim 15, wherein the gel element extends into the interior space.

17. The load cell of claim 15, wherein the gel element separates the force transmitting element from the interior space.

18. A method of manufacturing a load cell, comprising:
providing a force transmitting element, a force sensing element converting a force acting on the force transmitting element into a measurement signal, and a cover defining an interior space in which the force sensing element is disposed, the cover has a cover structure with an opening arranged opposite and spaced apart from the force sensing element, the force transmitting element extends through the opening into the interior space toward the force sensing element; and
positioning a gel element in the opening with the force transmitting element located in the opening, the force transmitting element rests against the gel element in the opening.

19. The method of claim 18, wherein the gel element is positioned in the opening by pouring a gel material into the opening with the force transmitting element located in the opening.

20. The method of claim 18, wherein the gel element is a unitary gel element installed in the opening with the force transmitting element located in the opening.

\* \* \* \* \*